(12) United States Patent
Kagawa

(10) Patent No.: US 11,943,409 B2
(45) Date of Patent: Mar. 26, 2024

(54) IMAGE FORMING SYSTEM CAPABLE OF CONNECTING AN EXTERNAL CONTROL APPARATUS TO AN IMAGE FORMING APPARATUS

(71) Applicant: CANON KABUSHIKI KAISHA, Tokyo (JP)

(72) Inventor: Yosuke Kagawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/188,336

(22) Filed: Mar. 22, 2023

(65) Prior Publication Data
US 2023/0319208 A1 Oct. 5, 2023

(30) Foreign Application Priority Data
Mar. 28, 2022 (JP) ................. 2022-052322

(51) Int. Cl.
*H04N 1/00* (2006.01)
*G06F 1/3231* (2019.01)

(52) U.S. Cl.
CPC ....... *H04N 1/00896* (2013.01); *G06F 1/3231* (2013.01); *H04N 1/00689* (2013.01); *H04N 1/00692* (2013.01)

(58) Field of Classification Search
None
See application file for complete search history.

(56) References Cited

U.S. PATENT DOCUMENTS

| 8,635,474 B2 | 1/2014 | Hayakawa | |
|---|---|---|---|
| 10,792,945 B2 | 10/2020 | Hasegawa | |
| 2014/0092417 A1* | 4/2014 | Kuroishi | H04N 1/00888 358/1.14 |
| 2015/0317106 A1* | 11/2015 | Mihira | G06F 3/1221 358/1.15 |
| 2021/0127026 A1* | 4/2021 | Miki | H04N 1/00896 |

* cited by examiner

*Primary Examiner* — Andrew H Lam
(74) *Attorney, Agent, or Firm* — Canon U.S.A., Inc. IP Division

(57) ABSTRACT

An image forming system includes: an information processing apparatus configured to output information related to a print job to form an image on a recording medium, the image forming apparatus being configured to be operable in a plurality of power modes including a first normal power mode in which the information is output and a first power saving mode in which power consumption is less than the first normal power mode; and an image forming apparatus having: an image forming unit configured to form an image on the recording medium based on the print job output from the image processing apparatus, and an operation unit to be operated by a user to instruct to form the image by the image forming unit.

3 Claims, 7 Drawing Sheets

IMAGE FORMING SYSTEM CAPABLE OF CONNECTING AN EXTERNAL CONTROL APPARATUS TO AN IMAGE FORMING APPARATUS

BACKGROUND

Field of the Disclosure

The present disclosure relates to an image forming apparatus to which an external control apparatus is to be connected.

Description of the Related Art

There is a demand for power saving in image forming apparatuses such as a multi-function peripheral (MFP) and a printer for offices. U.S. Pat. No. 8,635,474 B2 describes an image forming apparatus which reduces power consumption by quickly transitioning a power mode of the image forming apparatus to a sleep mode upon completing a print job for printing an image on a recording material.

Further, there has been known an image forming system having an image forming apparatus to form an image on a printing material and a control device provided outside the image forming apparatus and connected to the image forming apparatus (U.S. Pat. No. 8,635,474 B2). The control device may be called "DFE (Digital Front End)". The DFE described in U.S. Pat. No. 8,635,474 B2 generates image data based on contents of a print job sent from an external apparatus such as a personal computer (PC), and sends the generated image data to the image forming apparatus. The image forming apparatus performs a print process based on the image data acquired from the DFE.

Types of the DFE to be connected to the image forming apparatus include a type in which the DFE is directly connected to a main body of the image forming apparatus to be operated by an operation unit of the image forming apparatus, and another type in which the DFE is operated by a server PC which can communicate with the image forming apparatus. The DFE of a type operated by the operation unit of the image forming apparatus is referred to as "main body mounted type DFE". The DFE of a type operated by the server PC is referred to as "external server type DFE".

The image forming apparatus returns to a normal power mode from a power saving mode in a case where a user touches the operation unit of the image forming apparatus or in a case where a human detection unit detects a user. For example, in the image forming apparatus to which the external server type DFE is connected, in a case where the image forming apparatus returns from the power saving mode to the normal power mode due to the user touching the operation unit of the image forming apparatus, the external server type DFE will also return from the power saving mode to the normal power mode. That is, even in a case where the external server type DFE is not used, the image forming apparatus returns from the power saving mode to the normal power mode due to the user touching the operation unit of the image forming apparatus. This causes unnecessary power consumption in the external server type DFE. As a result, in the image forming system including the image forming apparatus and the external server type DFE, the power consumption increases.

SUMMARY

An image forming system according to embodiments of the present disclosure includes: an information processing apparatus configured to output information related to a print job to form an image on a recording medium, the image forming apparatus being configured to be operable in a plurality of power modes including a first normal power mode in which the information is output and a first power saving mode in which power consumption is less than the first normal power mode; and an image forming apparatus having: an image forming unit configured to form an image on the recording medium based on the print job output from the image processing apparatus; and an operation unit to be operated by a user to instruct to form the image by the image forming unit, the image forming apparatus being configured to be operable in a plurality of power modes including a second normal power mode in which the image is formed and a second power saving mode in which power consumption is less than the second normal power mode, wherein, in a case where the operation unit is operated in a state in which the power mode of the information processing apparatus is the first power saving mode and the power mode of the image forming apparatus is the second power saving mode, the power mode of the image forming apparatus is transitioned from the second power saving mode to the second normal power mode and the power mode of the information processing apparatus is maintained in the first power saving mode.

Further features of the present disclosure will become apparent from the following description of exemplary embodiments (with reference to the attached drawings).

DESCRIPTION OF THE EMBODIMENTS

In the following, at least one embodiment of the present disclosure is described with reference to the drawings.
<Image Forming Apparatus>

Figure 1:
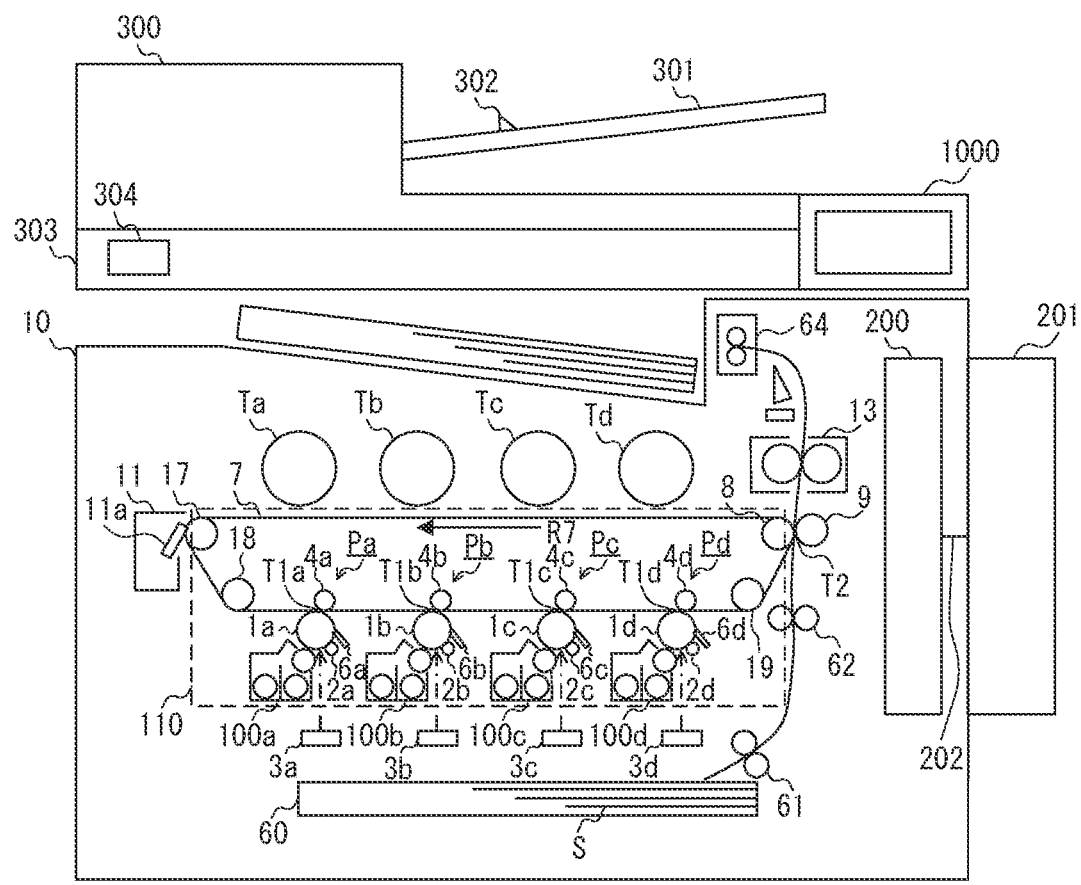
FIG. 1 is a diagram of an image forming apparatus having a main body mounted type external control apparatus.

FIG. 1 is a configuration diagram of an image forming apparatus having a main body mounted type external control apparatus according to the present disclosure. The image forming apparatus 10 constitutes an image forming system together with a main body mounted type DFE 201, which is a main body mounted type external control apparatus, an image reading apparatus 303 having an original conveyance apparatus 300, and an operation unit 1000. The image forming apparatus 10 forms a color image on a recording material S, which is a sheet-like recording medium, by electrophotographic process. Therefore, the image forming apparatus 10 includes a plurality of image forming units Pa-Pd (four in the present embodiment) corresponding to two or more colors (four colors in the present embodiment). In the image forming apparatus 10 of the present disclosure, an intermediate transfer tandem system is employed, and a plurality of image forming units Pa-Pd are arranged on an intermediate transfer belt 7.

The operation unit 1000 is a user interface having an input interface and an output interface. A user can input predetermined instructions using the operation unit 1000. The input interface includes various keys, a touch panel, and the like. The output interface is a display and a speaker.

The original conveyance apparatus 300 includes an original tray 301 in which originals are placed. The original tray 301 includes an original detection sensor 302 to detect that the original is placed. In a case where the user places originals on the original tray 301 to instruct the start of an original reading job by the operation unit 1000, the original conveyance apparatus 300 starts conveying the original one by one from the original tray 301.

The image reading apparatus 303 reads an image of the original conveyed by the original conveyance apparatus 300. Between the image reading apparatus 303 and the original conveyance apparatus 300, a platen glass (not shown) on which the original is placed is provided. The image reading apparatus 303 can also read an image of the original placed on the platen glass. The image reading apparatus 303 has a human detection sensor 304. The human detection sensor 304 detects the user approaching the image forming apparatus 10.

In the image forming apparatus 10, a controller 200 having a central processing unit (CPU) is installed. The controller 200 controls operations of the original conveyance apparatus 300, the image reading apparatus 303, the operation unit 1000, and a main body of the image forming apparatus 10. The controller 200 controls various operations of the image forming apparatus 100. The controller 200 is communicably connected to the main body mounted type DFE 201 via a communication line 202. The main body mounted type DFE 201 communicates with the controller 200 through the communication line 202, and generates image data suitable for a print process by the image forming apparatus 10.

Each of the image forming units Pa to Pd forms a toner image of a different color. In the present embodiment, the image forming unit Pa forms a yellow (Y) image. The image forming unit Pb forms a magenta (M) image. The image forming unit Pc forms a cyan (C) toner image. The image forming section 10K forms a black (K) toner image. Each of the image forming units Pa-Pd has the same configuration. Although image forming units Pa-Pd corresponding to four colors are explained in the present embodiment, these are not limited to four colors. Further, an arrangement of the image forming units Pa-Pd is not limited to that illustrated in FIG. 1.

The image forming units Pa-Pd include photoconductors 1a-1d, chargers 2a-2d, exposure devices 3a-3d, developing devices 100a-100d, primary transfer rollers 4a-4d, and photoconductor cleaners 6a-6d. The photoconductors 1a-1d are drum-shaped, and have a photosensitive layer on their surface. The chargers 2a-2d uniformly charge the surfaces of the rotating photoconductors 1a-1d. The exposure devices 3a-3d scan the surfaces of the charged photoconductors 1a-1d with laser beams modulated based on the image data. Electrostatic latent images are formed on the surfaces of the photoconductors 1a-1d by scanning with the laser beams. The developing devices 100a-100d develop electrostatic latent images with corresponding color developers (toners). As a result, images of corresponding colors (toner images) are formed on the photoconductors 1a-1d.

Developing devices 100a-100d are replenished with toner from toner storage units Ta-Td via corresponding toner replenishing devices (not shown) in a case where the amount of stored toner is reduced. In a case where the amount of toner in the toner replenishing device decreases, the toner is supplied from the toner storage units Ta to Td. The developing devices 100a-100d store two-component developer in which non-magnetic toner and magnetic carrier are mixed, or store single-component developer that is magnetic toner or non-magnetic toner alone. The toner storage units Ta-Td are arranged at a top portion of the image forming units Pa-Pd.

Primary transfer units T1a-T1d are formed between the primary transfer rollers 4a-4d and the corresponding photoconductors 1a-1d, with the intermediate transfer belt 7 in between. The primary transfer rollers 4a-4d transfer the toner image from the photoconductors 1a-1d on the intermediate transfer belt 7 by applying a predetermined pressure and an electrostatic load bias. Residual transfer toner remaining on the photoconductors 1a-1d after the transfer is collected by photoconductor cleaners 6a-6d.

The intermediate transfer belt 7 is an endless belt provided on an intermediate transfer belt frame (not shown) and stretched around a secondary transfer inner roller 8, tension rollers 17-18, and a secondary transfer upstream roller 19. The secondary transfer inner roller 8 rotates the intermediate transfer belt 7 in a direction of arrow R7. Toner images are sequentially transferred on the intermediate transfer belt 7 from the image forming units 1a-1d to be superimposed as the intermediate transfer belt 7 rotates. As a result, a full-color toner image is formed on the intermediate transfer belt 7. The intermediate transfer belt 7 rotates to convey the toner image, which is carried by the intermediate transfer belt 7, to the secondary transfer inner roller 8.

The image forming apparatus 10 includes a recording material storage 60 for storing the recording material S, a sheet feeding roller 61, registration rollers 62, and a secondary transfer outer roller 9. The recording material S is fed one by one from the recording material storage 60 by the sheet feeding roller 61 which employs a friction separation system. The sheet feeding roller 61 conveys the recording material S to the registration rollers 62 via a conveyance path. The registration rollers 62 correct a skew of the recording material S to convey the recording material S to the secondary transfer outer roller 9 in synchronization with the timing of image forming by the image forming units Pa-Pd.

The secondary transfer inner roller 8 and the secondary transfer outer roller 9 form a secondary transfer unit T2. The secondary transfer unit T2 nips and conveys, by a transfer nip portion formed by the secondary transfer inner roller 8 and the secondary transfer outer roller 9, the intermediate transfer belt 7, and the recording material S. At this time, the secondary transfer unit T2 transfers, with a given predetermined pressurizing force and an electrostatic load bias, the toner image carried by the intermediate transfer belt 7 onto the recording material S conveyed by the registration rollers 62. The transfer residual toner remaining on the intermediate transfer belt 7 after the transfer is collected by an intermediate transfer belt cleaner 11 arranged opposite to the tension rollers 17.

The recording material S on which the toner image has been transferred is conveyed to a fixing device 13 by the secondary transfer outer roller 9. The fixing device 13 includes a heating roller and a pressing roller. The fixing device 13 nips and conveys the recording material S on which the toner image has been transferred at a fixing nip formed by the heating roller and the pressing roller. At this time, the fixing device 13 heats and melts the toner image and presses it onto the recording material S to fix the same. As a result, the image is melted and fixed onto the recording material S. Therefore, the heating roller has a heater as a heat source and is controlled to maintain an optimum temperature. Therefore, the heating roller has a heater as a heat source and is controlled to maintain an optimum temperature. The recording material S on which the image is fixed is conveyed from the fixing device 13 to the discharge roller 64. The discharge roller 64 discharges the product, which is the recording material S on which the image is fixed, to an outside of the image forming apparatus 10. As described above, the image forming apparatus 10 performs a print process and creates a product.

Figure 2:
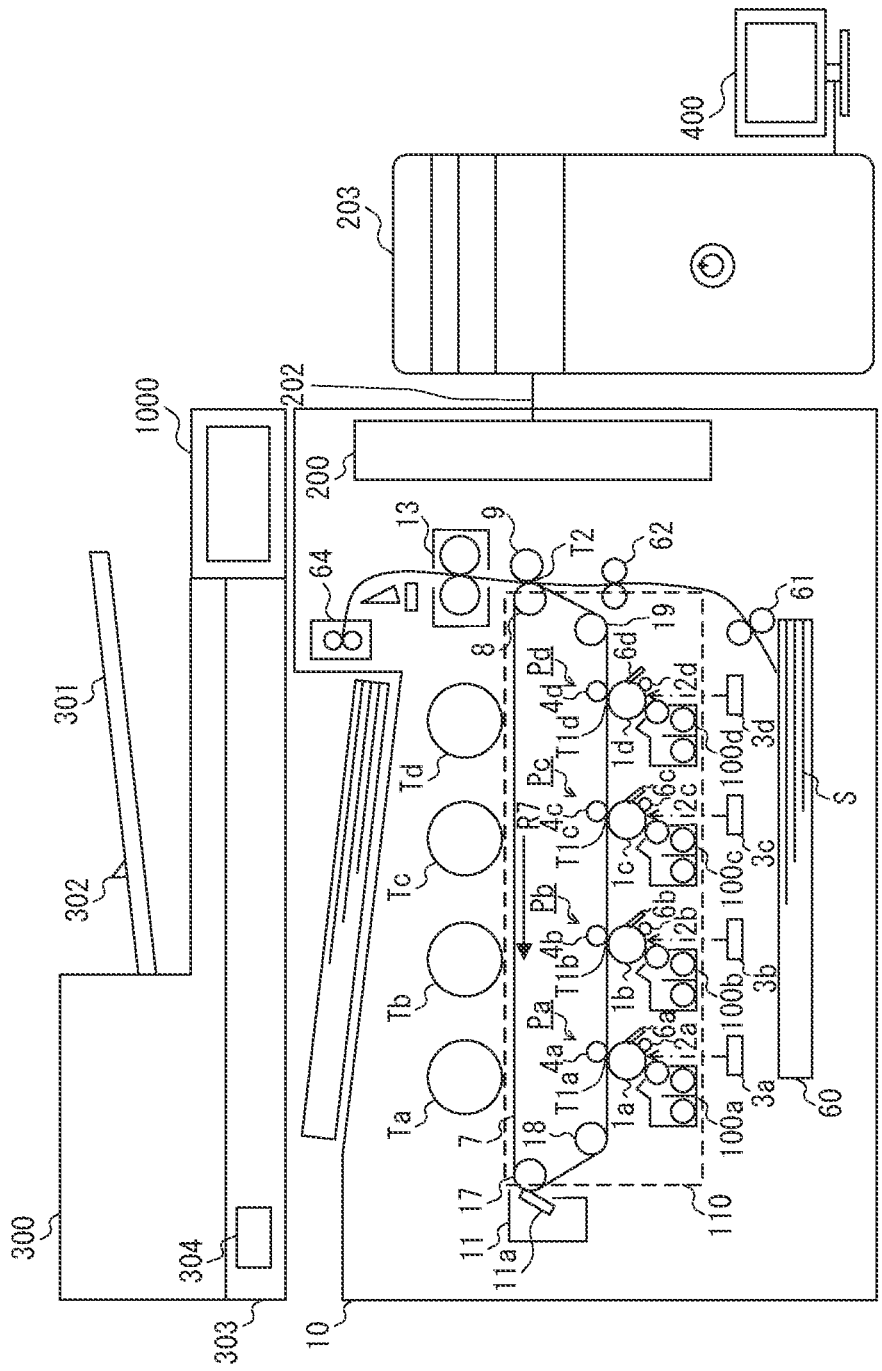
FIG. 2 is a diagram an image forming apparatus having an external server type external control apparatus.

FIG. 2 is a configuration diagram of an image forming apparatus having an external server type external control apparatus of the present disclosure. The image forming apparatus 10 constitutes an image forming system together with an external server type DFE 203, which is an external server type external control apparatus, the image reading apparatus 303 having the original conveyance apparatus 300, and the operation unit 1000. The external server type DFE 203 is connected to an external PC 400 which is an external apparatus. In a case where an instruction to print is input from the external PC 400, the external server type DFE 203 communicates with the controller 200 through the communication line 202 to generate image data suitable for the print process by the image forming apparatus 10. The constitutions and operations of the image forming apparatus 10, the original conveyance apparatus 300, the image reading apparatus 303, and the operation unit 1000 are the same as the image forming system of FIG. 1.

<System Controller>

Figure 3:
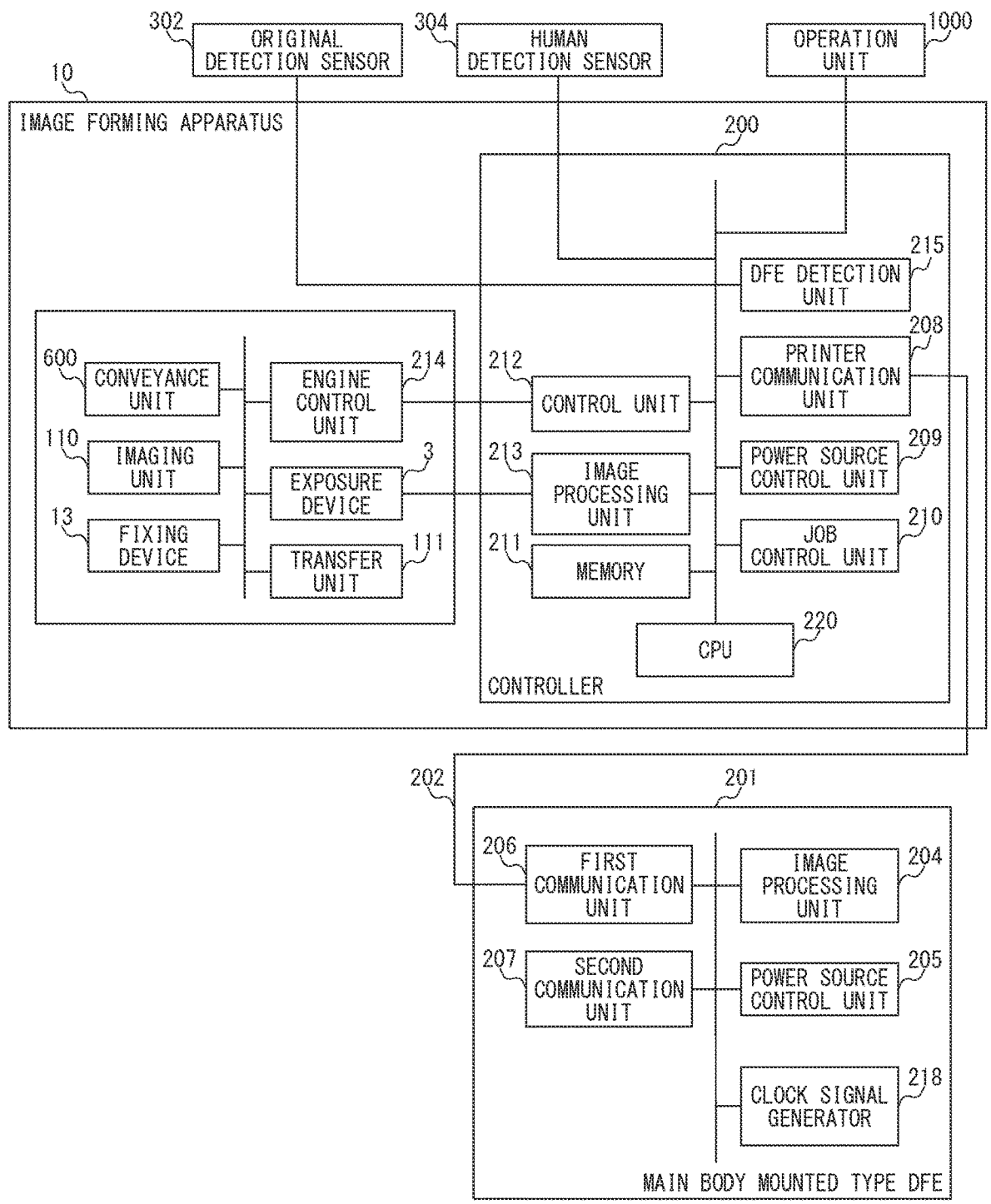
FIG. 3 is a configuration diagram of a control system.

FIG. 3 is a configuration diagram of a control system which controls an operation of the image forming apparatus 10 to which the main body mounted type DFE 201 is connected. The control system includes the controller 200, which is installed in the image forming apparatus 10, and the main body mounted type DFE 201. The controller 200 controls the operation of components inside the image forming apparatus 10 to control the above print process performed by the image forming apparatus 10.

The controller 200 includes a DFE detection unit 215 to determine whether the DFE connected to the image forming apparatus 10 is of a main body connected type which is connected to the main body, or it is of an external server type. The controller 200 performs, in a case where the DFE detection unit 215 detects that the main body mounted type DFE 201 is of a main body connected type, various processes according to instructions from the main body mounted type DFE 201.

The main body mounted type DFE 201 includes an image processing unit 204, a power source control unit 205, a first communication unit 206, a second communication unit 207, and a clock signal generator 218. The main body mounted type DFE 201 operates based on the clock signal generated by the clock signal generator 218. These functions are realized by, for example, a central processing unit (CPU) or microprocessor unit (MPU) executing a predetermined computer program. Further, these functions may be realized by a combination of application specific integrated circuit (ASIC) or predetermined electronic components.

A second communication unit 207 is a communication interface that controls communication with the external apparatus. The second communication unit 207 acquires information concerning the print job and image data which represents an image corresponding to the print job from an external PC or the like. Moreover, the main body mounted type DFE 201 acquires, in a case where the print job is input from the operation unit 1000, via the controller 200, the print job and the image data which represents the image corresponding to the print job, by the first communication unit 206, if a print job is inputted from the operation unit 1000. The image processing unit 204 performs a predetermined image process corresponding to the print job on the acquired image data to generate image data suitable for the print process by the image forming apparatus 10. The first communication unit 206 is a communication interface which controls communication with the controller 200 via the communication line 202. The first communication unit 206 transmits image data generated by the image processing unit 204 to the controller 200. The power source control unit 205 performs power source control of the main body mounted type DFE 201. The power source control unit 205 switches a power mode between a normal power mode for performing the job process and a power saving mode which consumes less power than the normal power mode. The clock signal generator 218 may, for example, lower the frequency of the clock signal in the power saving mode than that of the clock signal in the normal power mode. Even in the power saving mode, the main body mounted type DFE 201 can acquire the print job from outside. In the power saving mode, the main body mounted type DFE 201 may set a frequency (polling frequency) for acquiring information of the print job from the image forming apparatus 10 to be less than a frequency for acquiring information of the print job from the image forming apparatus 10 in the normal power mode.

The controller 200 includes, in addition to the DFE detection unit 215, a printer communication unit 208, a power source control unit 209, a job control unit 210, a memory 211, a control unit 212, and an image processing unit 213. These functions are realized, for example, by a CPU or an MPU executing a predetermined computer program. Also, these functions may be realized by a combination of an ASIC or predetermined electronic components. To the controller 200, the original detection sensor 302, the human detection sensor 304, and the operation unit 1000 are also connected.

The printer communication unit 208 is a communication interface which controls communication with the main body mounted type DFE 201 via the communication line 202. The printer communication unit 208 acquires image data from the main body mounted type DFE 201. The job control unit 210 registers the image data acquired by the printer communication unit 208 in a print cue. Jobs are stored in a job storing area provided in a memory 211. Jobs can be registered to the extent that the job storage area does not overflow. The image processing unit 213 performs a predetermined image process on the image data to transmit the result of the image process to the exposure device 3.

The control unit 212 controls the print process that is performed by the image forming apparatus 10. In the present embodiment, the control unit 212 determines the number of print queues representing the number of print jobs based on information stored in the memory 211. Further, based on the information stored in the memory 211, the control unit 212 calculates a job processing time, which is a time required to complete the print job. The control unit 212 stores the number of print queues and the job processing time in the memory 211 as print processing information. The print processing information includes the number of print queues, the job processing time, error information of the image forming apparatus 10, supply information such as the remaining amount of toner and a sheet, and status information such as a standby state and a printing state of the image forming apparatus 10. Thus, the print processing information is state information indicating a print state including the progress of the print process by the image forming apparatus 10. The print processing information is transmitted to the main body mounted type DFE 201 via the communication line 202 by the printer communication unit 208. The power source control unit 205 of the main body mounted type DFE 201 determines whether to control the main body mounted type DFE 201 to transition to the power saving mode based on the print processing information.

The control unit 212 transmits the contents (sheet size, paper thickness, paper feed cassette, and the like) of a job registered in the memory 211 to the engine control unit 214. The engine control unit 214 is connected to a conveyance unit 600, an imaging unit 110, a transfer unit 111, the fixing device 13 and the exposure device 3. The engine control unit 214 performs the print process by controlling these operations based on the content of the job to generate the product.

The conveyance unit 600 controls conveying of the recording material S by driving rollers used for discharging the recording material S from the recording material storage 60 to an outside of the image forming apparatus 10. The imaging unit 110 controls the operations of the image forming units Pa-Pd to form toner images on the photoconductors 1a-1d. The transfer unit 111 transfers the toner images formed on the photoconductors 1a-1d onto the recording material S by controlling the operations of the primary transfer rollers 4a-4d, the intermediate transfer belt 7, and the secondary transfer unit T2. The exposure device 3 scans the photoconductors 1a-1d with a laser light modulated based on the image data acquired from the image processing unit 213 of the controller 200.

The power source control unit 209 of the controller 200 controls a power source state of the image forming apparatus 10. The power source control unit 209 transitions the power mode, for example, in a case where a print process has been completed and the operation of the operation unit 1000 is not performed for a predetermined time (for example, one minute) and information related to the print job is not transmitted to the controller 200 from the main body mounted type DFE 201. Here, the power source control unit 209 transitions the power mode from the normal power mode, in which the image forming is allowed, to the power saving mode, in which power consumption is less than the normal power mode. In this case, the controller 200 controls the power source control unit 205 to transition the power mode of the main body mounted type DFE 201 from the normal power mode to the power saving mode. By transitioning to the power saving mode, the image forming apparatus 10 cuts off the power supply to each component except for the CPU 220 and the printer communication unit 208, for example, to reduce the power consumption.

In a case where the original detection sensor 302 of the original conveyance apparatus 300 detects the original in the power saving mode, the power source control unit 209 transitions the power mode from the power saving mode to the normal power mode. Moreover, in a case where the human detection sensor 304 detects the user in the power saving mode, the power source control unit 209 transitions the power mode from the power saving mode to the normal power mode. Furthermore, in a case where the operation unit 1000 is operated in the power saving mode, the power source control unit 209 transitions the power mode from the power saving mode to the normal power mode.

Figure 4:
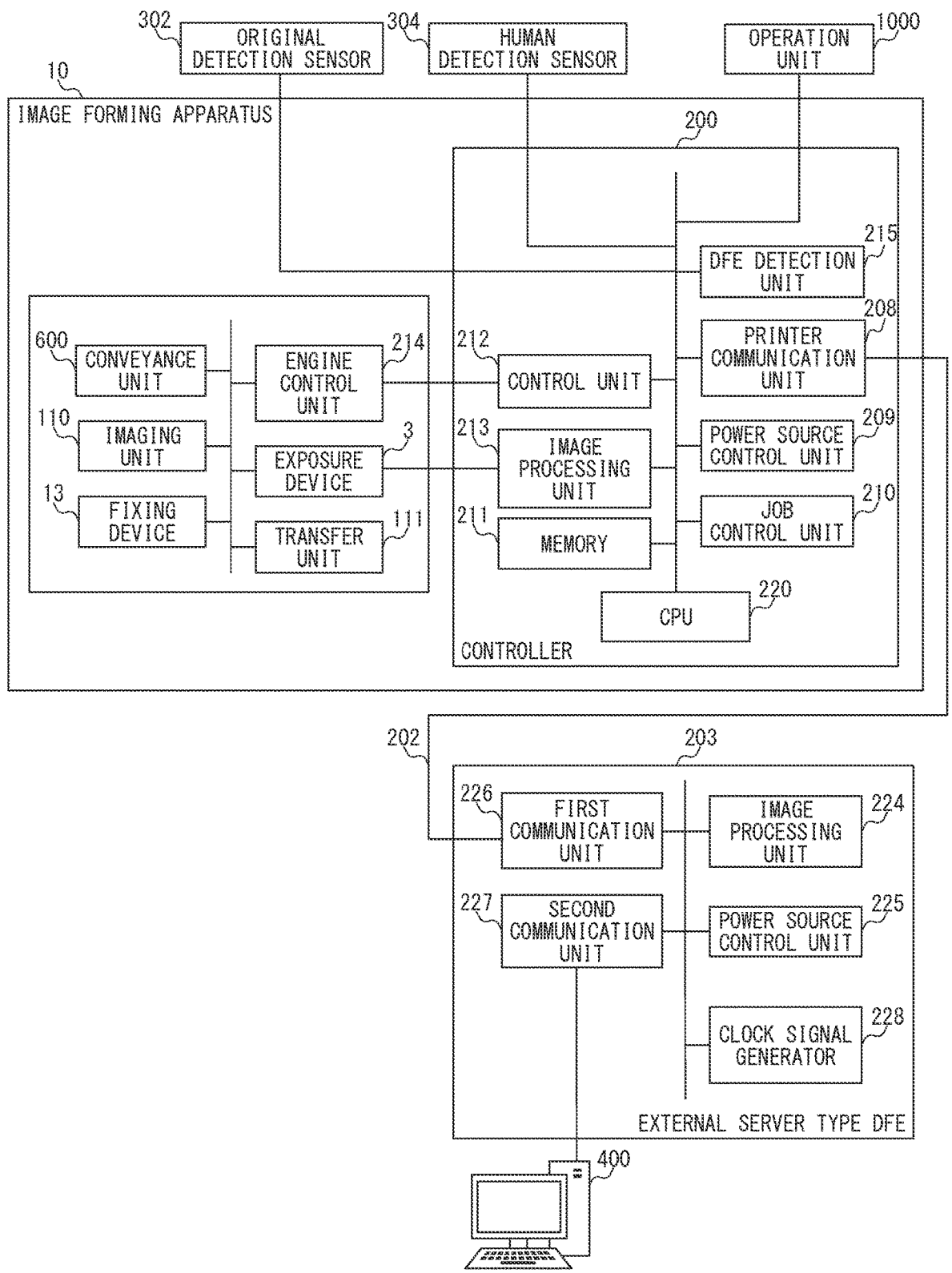
FIG. 4 is a configuration diagram of a control system.

FIG. 4 is a configuration diagram of a control system which controls the operation of the image forming apparatus 10 to which the external server type DFE 203 shown in FIG. 2 is connected. The control system includes the controller 200, which is installed in the image forming apparatus 10, and the external server type DFE 203. The external PC 400 is connected to the external server type DFE 203. Now, differences between the controller shown in FIG. 3 and the control system will be described.

The CPU 220 of the controller 200 detects whether the DFE connected to the main body of the image forming apparatus 10 (i.e., the external server type DFE 203) is of an external server type or a main body mounted type, based on the detection result by the DFE detection unit 215. The CPU 220 performs, in a case where the DFE detection unit 215 detects that the DFE connected to the image forming apparatus 10 is of an external server type, various processes according to instructions from the external server type DFE 203.

The external server type DFE 203 includes an image processing unit 224, a power source control unit 225, a first communication unit 226, a second communication unit 227 and a clock signal generator 228. The external server type DFE 203 operates based on the clock signal generated by the clock signal generator 218. These functions are realized, for example, by a CPU or an MPU executing a predetermined computer program. Also, these functions may be realized by a combination of an ASIC or predetermined electronic components.

A second communication unit 227 is a communication interface that controls communication with the external PC 400. The second communication unit 227 acquires information concerning the print job and image data which represents an image corresponding to the print job from the external PC 400 or the like. The image processing unit 224 performs a predetermined image process corresponding to the print job on the acquired image data to generate image data suitable for the print process by the image forming apparatus 10. The first communication unit 226 is a communication interface that controls communication with the controller 200 via the communication line 202. The first communication unit 226 transmits image data generated by the image processing unit 224 to the controller 200. The power source control unit 225 of the external server type DFE 203 determines whether to transition the power mode from the normal power mode, in which the job process is performed, to the power saving mode in which less power is consumed than in the normal power mode. In the power saving mode, the external server type DFE 203 suspends a print job conversion process by the image processing unit 224 and an image data transmission process to the image forming apparatus 10. In the power saving mode, the clock signal generator 228 may, for example, lower the frequency of the clock signal than the frequency of the clock signal in the normal power mode. In the power saving mode, for example, the power source control unit 225 may cut off power to the display, which is connected to the external server type DFE 203 to inform the user related to the processing content of the external server type DFE 203. The external server type DFE 203 can acquire the print job from the external PC 400 even in the power saving mode, and can acquire print processing information from the image forming apparatus 10. In the power saving mode, the external server type DFE 203 may set a frequency (polling frequency) for acquiring the print processing information from the image forming apparatus 10 to be less than a frequency for acquiring the print processing information from the image forming apparatus 10 in the normal power mode. As to the processes performed by controller 200, it has been described with reference to FIG. 3.

The power source control unit 209 of the controller 200 controls a power source state of the image forming apparatus 10. The power source control unit 209 transitions the power mode to the power saving mode, for example, in a case where a print process has been completed and the operation of the operation unit 1000 is not performed for a predetermined time (for example, one minute) and information related to the print job is not transmitted to the controller 200 from the external server type DFE 203. In this case, the controller 200 controls the power source control unit 225 to transition the power mode of the external server type DFE 203 from the normal power mode to the power saving mode. By transitioning to the power saving mode, the image forming apparatus 10 cuts off the power supply to each component except for the CPU 220 and the printer communication unit 208, for example, to reduce the power consumption.

In a case where the original detection sensor 302 of the original conveyance apparatus 300 detects the original in the power saving mode, the power source control unit 209 transitions the power mode from the power saving mode to the normal power mode. Further, when the external PC 400 is operated to provide input, the controller 200 acquires the input from the external PC 400 through the external server type DFE 203. The power source control unit 209 decides that the external PC 400 is operated by the input from the external PC 400, and transitions the power mode from the power saving mode to the normal power mode.

<Transition Process to Power Saving Mode>

Figure 5:
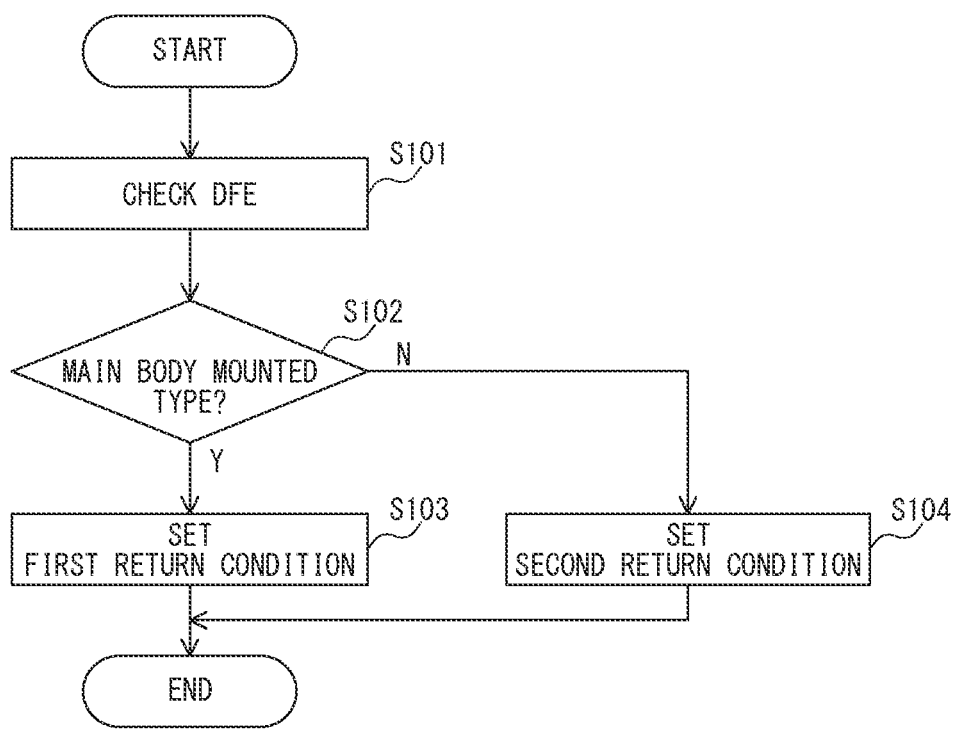
FIG. 5 is a flow chart representing a process to set a condition for returning from a power saving mode.
Figure 6:
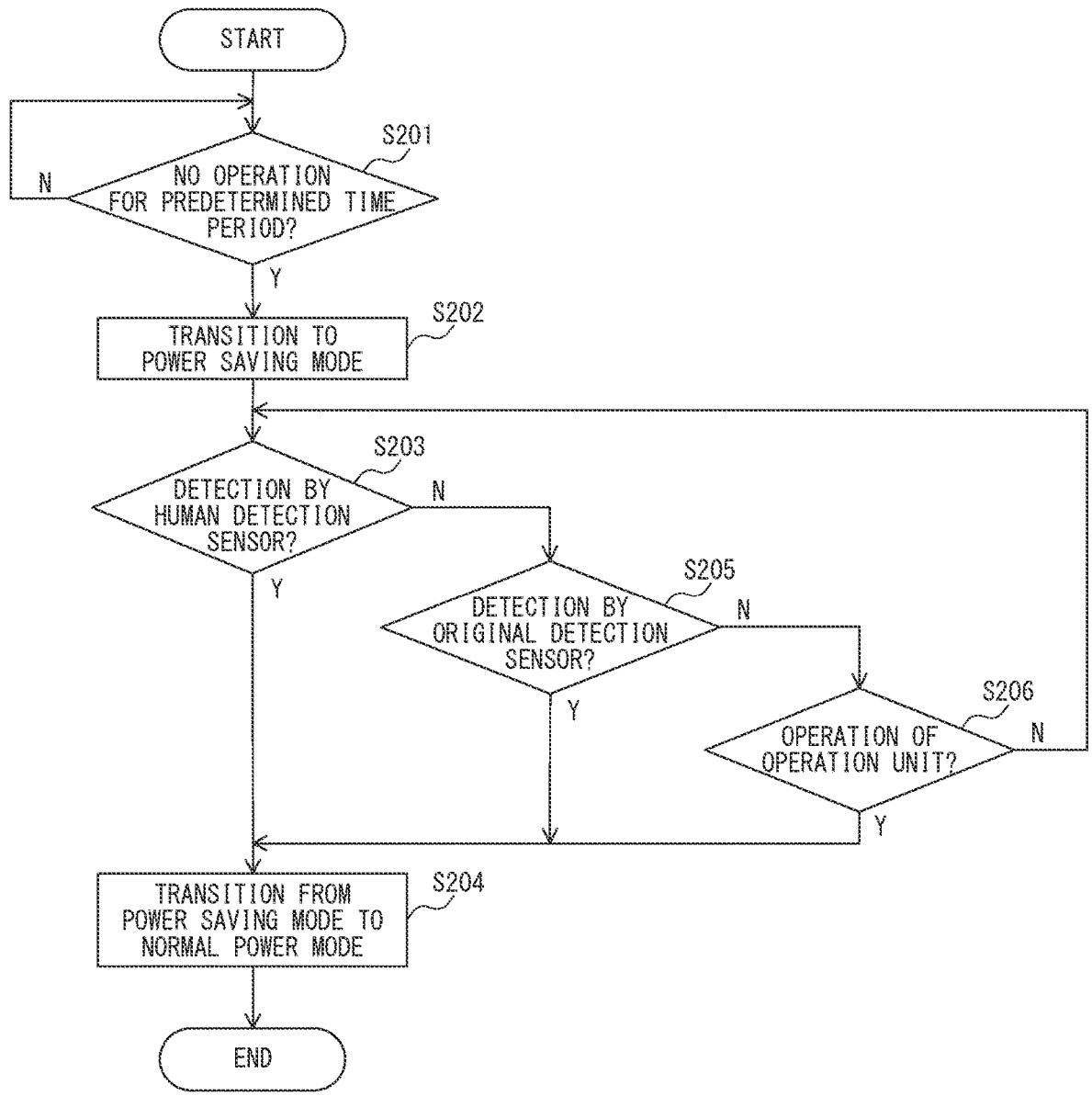
FIG. 6 is a flowchart explaining a return process of a main body mounted type DFE.
Figure 7:
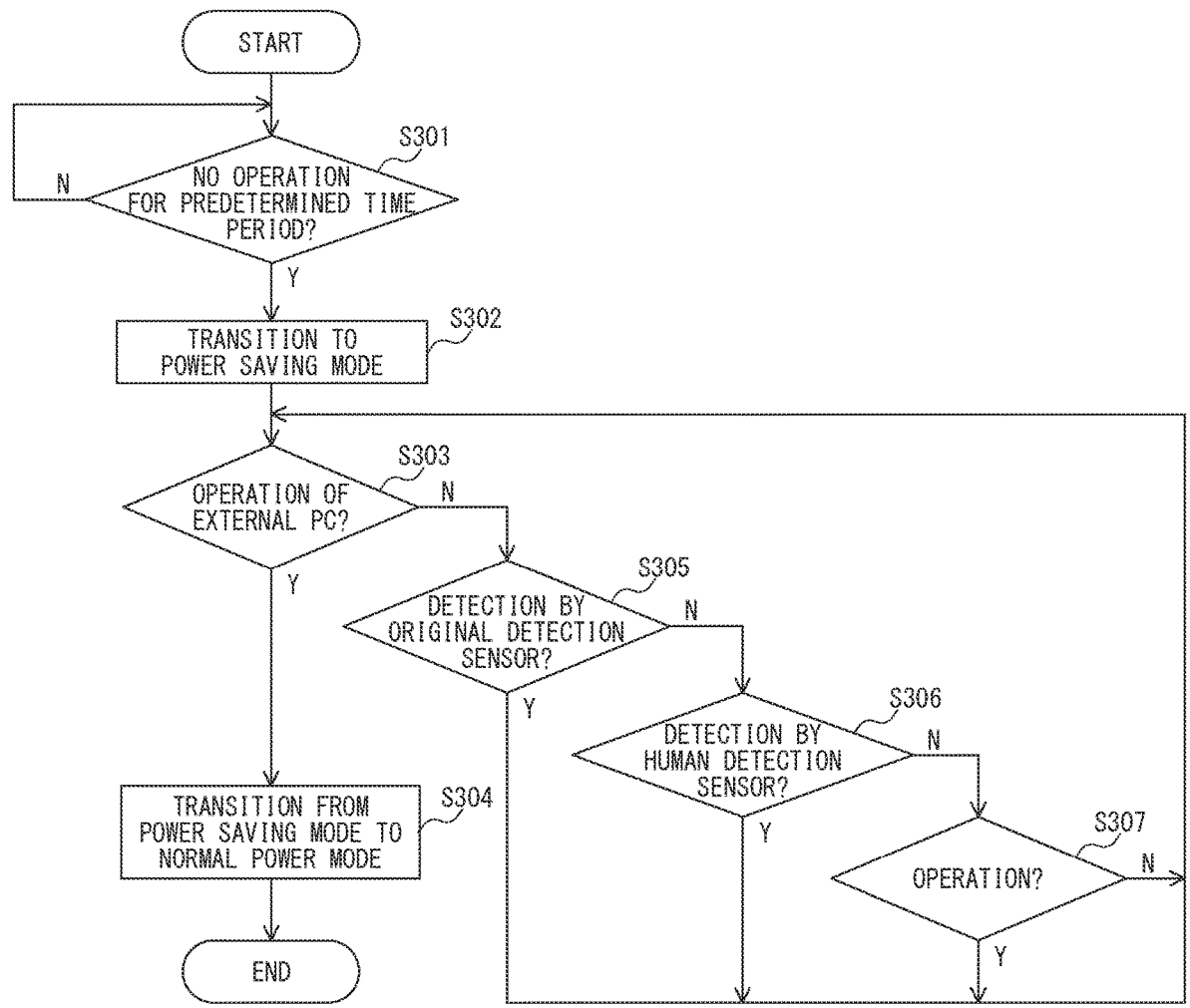
FIG. 7 is a flowchart representing a return process of an external server type DFE.

FIG. 5 is a process performed by CPU 220 before transitioning to the power saving mode, and represents a process to set a condition for returning from the power saving mode according to the type of the DFE connected to the image forming apparatus 10. FIG. 6 and FIG. 7 represent processes for returning the power mode of the DFE connected to the image forming apparatus 10 from the power saving mode to the normal power mode.

The CPU 220 checks the DFE connected to the image forming apparatus 10 by the DFE detection unit 215 (STEP S101). The CPU 220 decides whether the connected DFE is of a main body mounted type or not (STEP S102). In a case where the DFE is of a main body mounted type (STEP S102: Y), the CPU 220 sets a first return condition, which is described later, as a condition for the main body mounted type DFE 201 to return from the power saving mode to the normal power mode (STEP S103). In a case where the DFE is of an external server type (STEP S102: N), the CPU 220 sets a second return condition, which is different from the first return condition and is described later, as a condition for the external server type DFE 203 to return from the power saving mode to the normal power mode (STEP S104). The CPU 220 sets the return condition and ends the process. This process is performed, for example, at the time of startup of the image forming apparatus 10, at the time of return to the normal power mode, and at the time of power on.

FIG. 6 is a flow chart explaining a return process of the main body mounted type DFE 201. By the process of STEP S103, the first return condition is set as the return condition. The image forming apparatus 10 operates in the normal power mode at the time of starting this process.

The CPU 220 determines whether a time period during which the image forming apparatus 10 does not operate is more than or equal to a predetermined time period (for example, one minute) or not (STEP S201). Here, cases where the image forming apparatus 10 does not operate include a case where the operation unit 1000 is not operated, a case where the original detection sensor 302 does not detect an original, and a case where the image forming apparatus 10 does not operate. In a case where the time period during which the image forming apparatus 10 does not operate is less than the predetermined time (STEP S201: N), the CPU 220 maintains the power mode of the image forming apparatus 10 in the normal power mode.

In a case where the time period during which the image forming apparatus 10 does not operate is more than or equal to the predetermined time (STEP S201: Y), the CPU 220 transitions the power mode of the image forming apparatus 10 to the power saving mode (STEP S202). The CPU 220 controls the power source control unit 209 and the power source control unit 205 to transition the power mode of the image forming apparatus 10 and the power mode of the main body mounted type DFE 201 to the power saving mode.

In the power saving mode, the CPU 220 waits for one of the occurrence of detection of the user by the human detection sensor 304, detection of the original by the original detection sensor 302, or an operation of the operation unit 1000 by the user (STEPs S203, S205, and S206). The first return condition corresponds to the occurrence of at least one of the detection of the user by the human detection sensor 304, the detection of the original by the original detection sensor 302, or the operation of the operation unit 1000 by the user. In a case where the first return condition is met, the CPU 220 transitions the power mode of the image forming apparatus 10 from the power saving mode to the normal power mode (waiting state) (STEP S204). Further, in a case where the first return condition is satisfied, the CPU 220 transitions the power mode of the main body mounted type DFE 201 from the power saving mode to the normal power mode (waiting state).

FIG. 7 is a flow chart explaining the return process of the external server type DFE 203. Due to the process of STEP S104, the second return condition is set as the return condition. The image forming apparatus 10 operates in the normal power mode at the time of the starting of this process.

The CPU 220 determines whether the time period during which the image forming apparatus 10 does not operate is more than or equal to a predetermined time period (for example, 1 minute) or not (STEP S301). Here, cases where the image forming apparatus 10 does not operate include a case where the external PC 400 and the operation unit 1000 are not operated, a case where the original detection sensor 302 does not detect the original, and a case where the image forming apparatus 10 does not operate. In a case where the period during which the image forming apparatus 10 does not operate is less than the predetermined time (STEP S301: N), the CPU 220 maintains the power mode of the image forming apparatus 10 in the normal power mode.

In a case where the time period during which the image forming apparatus 10 does not operate is more than or equal to the predetermined time (STEP S301: Y), the CPU 220 transitions the power mode of the image forming apparatus 10 to the power saving mode (STEP S302). The CPU 220 controls the power source control unit 209 and the power source control unit 205 to transition the power mode of the image forming apparatus 10 and the power mode of the external server type DFE 203 to the power saving mode.

In the power saving mode, the CPU 220 waits for one of the occurrence of an operation of the external PC 400, a detection of the original by the original detection sensor 302, a detection of the user by the human detection sensor 304, or an operation of the operation unit 1000 (STEPs S303, S305, S306, and S307). In a case where the operation of the external PC 400 occurs (STEP S303: Y), the CPU 220 switches the power mode of the image forming apparatus 10, and the power mode of the external server type DFE 203 from the power saving mode to the normal power mode. The operation of the external PC 400 corresponds to the input of information representing the content of the print job from the external PC 400 to the external server type DFE 203, for example. In a case where the information representing the contents of the print job is input, the power source control unit 225 switches the power mode from the power saving mode to the normal power mode. Further, in a case where the CPU 220 is notified that the information representing the contents of the print job is input from the external server type DFE 203, the power source control unit 209 switches the power mode from the power saving mode to the normal power mode (waiting state) (STEP S304).

In a case where the detection of the original by the original detection sensor 302 has occurred (STEP S305: Y), the power source control unit 209 changes the power mode of the image forming apparatus 10 from the power saving mode to the normal power mode. That is, the power mode of the external server type DFE 203 is maintained in the power saving mode. In a case where the detection of the user by the human detection sensor 304 occurs (STEP S306: Y), the power source control unit 209 changes the power mode of the image forming apparatus 10 from the power saving mode to the normal power mode. That is, the power mode of the external server type DFE 203 is maintained in the power saving mode. In a case where the operation of the operation unit 1000 by a user occurs (STEP S307: Y), the power source control unit 209 changes the power mode of the image forming apparatus 10 from the power saving mode to the normal power mode. That is, the power mode of external server type DFE 203 is maintained by power saving mode. Thus, the operation of the external PC 400 serves as the second return conditions.

As described above, the first return condition of the image forming apparatus 10 to which the main body mounted type DFE 201 is connected includes a detection result of the human detection sensor 304, a detection result of the original detection sensor 302, and presence or absence of an operation of the operation unit 1000. The second return condition of the image forming apparatus 10 to which the external server type DFE 203 is connected is the existence of operation of the external PC 400.

As to the image forming apparatus to which the main body mounted type DFE 201 and the external server type DFE 203 can be selectively connected, the return condition from the power saving mode will differ dependent on the type of the connected DFE. In the present disclosure, in a case where the external server type DFE 203 is connected, in the image forming apparatus 10, neither the detection result of the operation of the operation unit 1000 nor the detection result of the human detection sensor 304 meets the return condition from power saving mode. Therefore, even if the user unintentionally operated the operation unit 1000, the image forming apparatus 10 does not return from power saving mode. Further, in a case where the user merely approaches the image forming apparatus 10, the image forming apparatus 10 does not return from power saving mode. In this configuration, the image forming apparatus 10 to which the external server type DFE 203 is connected can prevent excessive power consumption since an unintentional return from the power saving mode does not occur. As a result, the increase in the power consumption in the image forming system can be suppressed. Although the human detection sensor 304 is provided to the image reading apparatus 303 in the above disclosure, the human detection sensor 304 may be provided to the image forming apparatus 10. Thus, in the present disclosure, excessive power consumption can be prevented depending on the type of the connected external control device by preventing the unintentional return from the power saving mode to the normal power mode.

It is noted that neither the condition for transitioning to the power saving mode nor the return condition from the power saving mode is restricted to the above described conditions. In a case where the conditions for returning from the power saving mode differ depending on the connection type of DFE, the present disclosure can be applied. As described above, the present disclosure provides the image forming apparatus in which unnecessary returning from the power saving mode to the normal power mode is prevented.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-052322, filed Mar. 28, 2022, which is hereby incorporated by reference herein in its entirety.

What is claimed is:

1. An image forming system comprising:
an information processing apparatus configured to output information related to a print job to form an image on a recording medium, the information processing apparatus being configured to be operable in a plurality of power modes including a first normal power mode in which the information is output and a first power saving mode in which power consumption is less than the first normal power mode; and
an image forming apparatus having:
an image forming unit configured to form the image on the recording medium based on the print job output from the information processing apparatus;
an operation unit to be operated by a user to instruct to form the image by the image forming unit, the image forming apparatus being configured to be operable in a plurality of power modes including a second normal power mode in which the image is formed and a second power saving mode in which power consumption is less than the second normal power mode; and
a human detection unit configured to detect the user approaching the image forming apparatus,
wherein, in a case where the operation unit is operated in a state in which the power mode of the information processing apparatus is the first power saving mode and the power mode of the image forming apparatus is the second power saving mode, the power mode of the image forming apparatus is transitioned from the second power saving mode to the second normal power mode and the power mode of the information processing apparatus is maintained in the first power saving mode, and
wherein, in a case where the user is detected by the human detection unit in a state in which the power mode of the information processing apparatus is the first power saving mode and the power mode of the image forming apparatus is the second power saving mode, the power mode of the image forming apparatus is transitioned from the second power saving mode to the second normal power mode and the power mode of the information processing apparatus is maintained in the first power saving mode.

2. The image forming system according to claim 1,
wherein the information processing apparatus has a second operation unit which is operated by the user to instruct to output the information related to the print job,
wherein, in a case where the second operation unit is operated in a state in which the power mode of the information processing apparatus is the first normal power mode, the power mode of the information processing apparatus is transitioned from the first power saving mode to the first normal power mode.

3. An image forming system comprising:
an information processing apparatus configured to output information related to a print job to form an image on a recording medium, the information processing apparatus being configured to be operable in a plurality of power modes including a first normal power mode in which the information is output and a first power saving mode in which power consumption is less than the first normal power mode; and
an image forming apparatus having:
  an image forming unit configured to form the image on the recording medium based on the print job output from the information processing apparatus;
  an operation unit to be operated by a user to instruct to form the image by the image forming unit, the image forming apparatus being configured to be operable in a plurality of power modes including a second normal power mode in which the image is formed and a second power saving mode in which power consumption is less than the second normal power mode;
  a stacking unit on which an original is stacked;
  a sensor configured to detect presence or absence of the original stacked on the stacking unit;
  a conveyance unit configured to convey the original stacked on the stacking unit; and
  a reading unit configured to read an image of the original conveyed by the conveyance unit,
wherein, in a case where the operation unit is operated in a state in which the power mode of the information processing apparatus is the first power saving mode and the power mode of the image forming apparatus is the second power saving mode, the power mode of the image forming apparatus is transitioned from the second power saving mode to the second normal power mode and the power mode of the information processing apparatus is maintained in the first power saving mode, and
wherein, in a case where the original is detected by the sensor in a state in which the power mode of the information processing apparatus is the first power saving mode and the power mode of the image forming apparatus is the second power saving mode, the power mode of the image forming apparatus is transitioned from the second power saving mode to the second normal power mode and the power mode of the information processing apparatus is maintained in the first power saving mode.

* * * * *